(12) United States Patent
Leblanc et al.

(10) Patent No.: US 6,786,728 B2
(45) Date of Patent: Sep. 7, 2004

(54) METHOD AND BLANK FOR PROVIDING A CUSTOMIZABLE DECORATIVE STRUCTURE

(76) Inventors: Donald Leblanc, 31, rue du Parc, St-Michel de Napierville, QBC (CA), J0L 2J0; Luc Desmarais, 109, rue Maurice, St-Remi, QBC (CA), J0L 2L0

( * ) Notice: Subject to any disclaimer, the term of this patent is extended or adjusted under 35 U.S.C. 154(b) by 0 days.

(21) Appl. No.: 10/151,551

(22) Filed: May 20, 2002

(65) Prior Publication Data

US 2003/0215772 A1 Nov. 20, 2003

Related U.S. Application Data

(60) Provisional application No. 60/291,936, filed on May 21, 2001.

(51) Int. Cl.[7] .............................................. G09B 11/10
(52) U.S. Cl. ..................................................... 434/84
(58) Field of Search .............................. 434/81, 84, 85, 434/87, 88

(56) References Cited

U.S. PATENT DOCUMENTS

| | | | | |
|---|---|---|---|---|
| 3,651,842 A | * | 3/1972 | McLean | ................... 144/136.1 |
| 3,704,531 A | | 12/1972 | Seals | |
| 3,747,232 A | * | 7/1973 | Donaldson et al. | ........... 434/84 |
| 3,908,588 A | | 9/1975 | Daunheimer et al. | |
| 4,073,070 A | * | 2/1978 | Boston | ........................ 434/84 |
| 4,212,393 A | * | 7/1980 | Lenkoff | ....................... 206/575 |
| 4,844,850 A | | 7/1989 | Harder | |
| 5,019,198 A | | 5/1991 | Schäfer et al. | |
| 5,106,305 A | * | 4/1992 | Grant | ........................... 434/84 |
| 5,217,378 A | * | 6/1993 | Donovan | ..................... 434/116 |
| 5,292,255 A | * | 3/1994 | Goldwasser | .................. 434/84 |
| 5,364,470 A | * | 11/1994 | Greenberg | ................... 118/500 |
| 5,447,770 A | | 9/1995 | Smith | |
| 5,460,087 A | | 10/1995 | Ogorzalek | |
| 5,640,790 A | | 6/1997 | Johns | |
| 5,727,979 A | | 3/1998 | Spector | |
| 5,897,322 A | * | 4/1999 | Shteyngarts | ................. 434/84 |
| 6,251,480 B1 | | 6/2001 | Jackson | |

* cited by examiner

Primary Examiner—Kurt Fernstrom (57) ABSTRACT

A blank intended to be first customized by allowing an intended user to color feature sections and outlines thereof and then to be used as a decorating article providing a decorative design. The blank includes a generally rigid panel defining a pair of opposed panel surfaces. Grooves are formed in one of the panel surfaces for outlining the feature sections. The grooves are configured and sized for sufficiently separating adjacent feature sections so as to facilitate the application of a coloring material on the feature sections with reduced risks of overlapping. The grooves are also designed so as to guide a coloring implement during the application of coloring material to the groove bottom surface. The blank is made out of a material that allows sanding away of unintentionally colored areas. The blank may be used individually or combined with other complementary blanks for forming a composite decoration assembly.

18 Claims, 4 Drawing Sheets

METHOD AND BLANK FOR PROVIDING A CUSTOMIZABLE DECORATIVE STRUCTURE

CROSS-REFERENCE TO RELATED APPLICATION

Benefit of U.S. Provisional Application for Patent Serial No. 60/291,936, filed on May 21, 2001, is hereby claimed.

FIELD OF THE INVENTION

The present invention relates to the general field of decorative articles and is particularly concerned with a method and a blank for providing a customizable decorative structure.

BACKGROUND OF THE INVENTION

The decoration of human habitat for allowing humans to express themselves and for providing an esthetically pleasing environment go back as far as prehistoric times when cavemen are believed to have painted hunting scenes on cave walls. The practice of providing esthetically pleasing decorations on walls or other supporting surfaces seems to have evolved cyclically eversince. The relatively recent trend of spending more time indoors and especially inside one's living quarters, commonly referred to as "cocooning" has led to a concurrent trend towards searching for novel decoration articles.

With the advent of the so-called leisure society there also seems to exist an increased need for leisure activities and, in particular, for family oriented indoor leisure activities. Hobbies such as arts and crafts activities seem to have recently gain increased interest.

The combined interest for decoration articles and hobby related articles has been recognized in the prior art. For example, U.S. Pat. No. 5,640,790 naming Daniel M Johns as inventor and issued Jun. 24, 1997 discloses a collector plate kit including an outer free member and a selectively immovable inner member. The inner member carries a decorative design indicia thereon. The indicia may be painted by the intended collector to suit a particular design scheme.

The kit disclosed in the hereinabove mentioned patent provides a decorative article that, in contrast with paintings inscribed directly on the wall may be readily changed has the taste or preferences of the intended user evolve. Since the tastes of children in particular seem to evolve as they grow this may prove to be particularly useful for decorating children's room or the like.

Also, the structure disclosed in U.S. Pat. No. 5,640,790 provides an outline for the decorative indicia formed on the undersurface of the inner member. The outline of the decorative indicia includes a plurality of outwardly projected ribs that act as an outline to facilitate and guide and intended user in the application of appropriate paints within the area defined by the ribs. Hence, different features may be painted on the surface of the inner member with limited manual dexterity requirements.

Delimiting specific areas of the surface to be painted with guiding ridges provides an interesting advantage over prior methods. Indeed, some of the conventional methods for applying two or more colors of paint in such a way that the individual paint not cover all of the substrate to be painted and so that the colors are sharply delimited from one another have proven to be tedious and inefficient. One of these prior art method involves coating the substrate with paint of a first color, drying the first layer and then covering up the area so painted whereupon the uncovered areas are then painted with a second layer of paint. This conventional method is time-consuming owing to the need for drying between the application of any two paints.

This conventional method also requires some degree of manual dexterity since it may be deemed considerably difficult to make sharp demarcations between differently colored areas. The difficulty is at least in part related to the fact that portions of the applied paint typically cross the boundary line to settle in the adjacent area.

Various techniques have been used to obviate this problem. One typical method is to apply so-called "masking tape" of suitable width along the dividing line on the side of the adjacent area that should not be painted. Another is to completely cover the adjacent area exposing only the surface to be painted.

In either of these methods, desired effects have been obtained in preventing the masked area from being smeared with paint. However, these prior art methods have been found to cause other problems. Firstly, processes involved are themselves not very efficient in actual practice and also not suitable for applications in some artistic settings.

Secondly, the subsequent removal of the masking tape tends to cause the jagging of the edge of the film of coating which borders on the tape. This jagging is sometimes caused by the removal that destroys the coating of paint dried across the surface of the tape. In other instances, the removal of the tape can entail the scraping of flakes of the layer along the edge of the painted layer where the paint is not fully dried together with the tape.

Hence, the ribs or ridges provided by the structure disclosed in U.S. Pat. No. 5,640,790 seem to provide a great advantage over prior art structures and methods for allowing the painting of decoration articles requiring demarcation between the differently colored feature sections. However, the use of ribs or ridges suffers from numerous drawbacks.

The ribs protruding from the feature sections unduly increase the overall thickness of the decorative panel hence leading to increase required storage volume. Also, since the ribs protrude from the feature sections, they are susceptible of being damaged or broken during shipping or handling of the panel. Furthermore, painting of the outermost portion of the ribs may prove to be difficult and may potentially lead to dripping of the painted outermost section on the side surfaces of the ribs creating an unpleasant visual effect.

Accordingly, there exists a need for an improved decorative and craft related structure and method for providing the same.

SUMMARY OF THE INVENTION

It is an object of the present invention to provide a combined decorative and craft related structure and method for providing the same.

Advantages of the present invention include that the proposed structure is intended to be used both as craft article allowing an intended user to exercise leisure craft skills and to also be used as a decorating article for decorating a supporting surface once the decorating article has been customized by the intended user using his/her craft skills.

The proposed decorative structure allows an intended user, even with limited experience, skills or dexterity, to apply coloring material such as paint to various feature sections of the structure with reduced risks of overlapping so as to enable the intended user to define sharply delimited feature regions creating a pleasing esthetical effect. Hence, the proposed structure and method allows an intended user with limited skills such as an handicapped person or a child to the apply a multicolored pattern on a structure in which all different colored painted areas are relatively sharply delimited from one another through the use of conventional color applying implements such as a conventional painting brush.

More specifically, the proposed structure allows for coloring of both feature sections of the design and outlining areas with different colors with reduced risks of overlapping between feature sections and/or between a feature sections and an adjacent outlining area. The outlining grooves are designed so as to guide the intended user in the application of paint with other coloring material therein. The outlining areas are also designed so as to reduce the risks of overlapping by providing a physical gap between adjacent feature sections.

The proposed structure further optionally allows the intended user to easily and readily remove paint from unintentionally painted areas through a set of quick and ergonomical steps. More specifically, the proposed structure allows an intended user to abrasively remove unintentionally applied paint using conventional sanding paper.

The proposed structure is designed so as to be manufacturable using conventional forms of manufacturing so as to provide a decorative structure that would be economically feasible, long-lasting and relatively trouble-free in operation.

Still furthermore, the proposed structure and method allows for the creation of composite wall designs by juxtaposing structures in accordance with the present invention so as to create and esthetically pleasing visual effect. The mounting of the structures in accordance with the present invention on supporting surfaces are facilitated by mounting components built-in to the structures. The mounting on supporting surfaces may be performed with minimal risks of damaging the structure and/or mounting surfaces on which they are attached. The mounting of the structures on the supporting surfaces may be performed by a set of quick and ergonomical steps without requiring special tooling or manual dexterity.

According to an aspect of the present invention, there is provided a blank for forming a decorative structure, the decorative structure being intended to be used for decorating a supporting surface by displaying a decorative design having feature sections delimitated by an outline, at least some of the feature sections and part of the outline being intended to be colored by an intended user using a coloring implement, the coloring implement having a coloring section dispensing a color pigmented material, the blank comprising:

a rigid panel, the panel having a panel first surface and an opposed panel second surface, the panel defining a panel thickness between the panel first and second surfaces;

the panel first surface having a groove formed therein, the groove extending at least partially along a section of the outline for creating a depression in the panel first surface between adjacent feature sections, the groove having a groove base wall and a pair of groove side walls extending between peripheral edges of the groove base wall and the panel first surface, the groove defining a groove depth between the groove base wall and the panel first surface and a groove width the adjacent peripheral edges of the groove base wall, the groove depth and the groove width allowing the demarcation of the adjacent feature sections, the adjacent feature sections and the groove base wall being made out of a pigment receiving material allowing application and retention thereon of the color pigmented material;

whereby the groove physically separates the adjacent peripheral edges of the adjacent feature sections so as to facilitate the application of the color pigmented material on the adjacent feature sections with reduced risks of overlapping so as to allow for the sharp coloring of the adjacent peripheral edges and whereby the groove further guides the coloring section during the application of the color pigmented material to the groove base wall so as to also allow for the sharp delimitation of the adjacent feature sections by the outline.

Preferably, at least a section of the panel first surface is made out of an abrasively removable material whereby a layer of the panel first surface part of a corresponding feature section is abrasively removable by a manual sanding operation using a sand paper.

Typically, the blank defines a panel peripheral edge, the panel first surface being optionally provided with a peripheral ridge extending from the panel first surface and extending at least partially along the panel peripheral edge generally adjacent the latter.

Typically, the groove has a groove width to groove depth ratio having a value of about between 1.25 to 2.5. In one embodiment of the invention, the panel is made out of fiberboard, the groove width has a value of about 0.25 inch and the groove depth has a value of between 0.125 and 0.100 inch. In another embodiment of the invention, the panel is made out of fiberboard, the groove width has a value of about 0.125 inch and the groove depth has a value no greater than 0.100 inch.

In one embodiment of the invention, the groove has a generally U-shaped cross-sectional configuration with the groove side walls extending generally perpendicularly from the peripheral edges of the groove base wall. In another embodiment of the invention the groove has a generally U-shaped cross-sectional configuration with the groove side walls extending at an angle relative to the groove base wall, groove side walls diverging outwardly away from each other in a direction leading from the groove base wall to the panel first surface.

Conveniently, the color pigmented material is a liquid and wherein the adjacent feature sections and the groove base wall are made out of a liquid impregnable material for allowing the color pigmented material to impregnate the adjacent feature sections and the groove base wall.

Typically, the blank further comprises a mounting means attachable to the panel second surface for mounting the panel on the supporting surface.

Preferably, the mounting means is a releasable mounting means for releasably mounting the panel on the supporting surface.

Conveniently, the mounting means includes a first mounting strip of miniature hook and loop fiber and a complementary second mounting strip of miniature hook and loop fiber, the first and second mounting strips being attachable respectively to the panel second surface and to the supporting surface.

In accordance with the present invention, there is also provided, in combination, a blank for forming a decorative structure and a coloring implement for coloring at least part of the decorative structure, the decorative structure being intended to be used for decorating a supporting surface by displaying a decorative design having feature sections delimitated by an outline, at least part of the outline being intended to be colored by an intended user using the coloring implement, the coloring implement having a coloring section for dispensing a color pigmented material, the coloring section having a coloring section width, the blank comprising:

a generally rigid panel, the panel having a panel first surface and an opposed panel second surface, the panel defining a panel thickness between the panel first and second surfaces;

the panel first surface having a groove formed therein, the groove extending at least partially along a section of the outline for creating a depression in the panel first surface between adjacent feature sections, the groove having a groove bottom surface and a pair of groove side walls extending between the peripheral edges of the groove bottom surface and the panel first surface, the groove defining a groove depth between the groove bottom surface and the panel first surface and a groove width between adjacent peripheral edges of the adjacent feature sections separated by the groove, the groove being configured and sized for substantially fittingly receiving at least a section of the coloring section and for allowing the coloring section to contact the groove base wall without contacting the adjacent feature sections, the adjacent feature sections and the groove bottom surface being made out of a pigment receiving material allowing the application and retention thereon of the color pigmented material;

a mounting means attachable to the panel second surface for mounting the panel on the supporting surface;

whereby the groove physically separates the adjacent peripheral edges of the adjacent feature sections so as to facilitate the application of the color pigmented material on the adjacent feature sections with reduced risks of overlapping so as to allow for the sharp coloring of the adjacent peripheral edges and whereby the groove further guides the coloring section during the application of the color pigmented material to the groove bottom surface so as to also allow for the sharp delimitation of the adjacent feature sections by the outline.

Preferably, the combination further includes a first color pigmented material and a second color pigmented material, the first and second color pigmented materials being in a liquid form, the first and second color pigmented materials having distinct color tones, the adjacent feature sections being made out of an abrasively removable material; the adjacent feature sections and the groove base wall being made out of a liquid impregnable material for allowing the color pigmented material to impregnate the adjacent feature sections and the groove base wall;

whereby the first color pigmented material is intended to be applied on the groove base wall and the second color pigmented material is intended to be applied on the adjacent feature sections and wherein adjacent feature sections having been unintentionally covered by the first color pigmented material during the application of the first color pigmented may be abrasively cleared of the first color pigmented material prior to applying the second color tone on the adjacent feature sections by a manual sanding operation.

Other objects and advantages of the present invention will become apparent from a careful reading of the detailed description provided herein, within appropriate reference to the accompanying drawings.

BRIEF DESCRIPTION OF THE DRAWINGS

Embodiments of the present invention will now be disclosed, by way of example, in reference to the following drawings in which like reference characters indicate like elements throughout.

DETAILED DESCRIPTION OF THE PREFERRED EMBODIMENTS

With reference to the annexed drawings the preferred embodiments of the present invention will be herein described for indicative purpose and by no means as of limitation.

Figure 4:
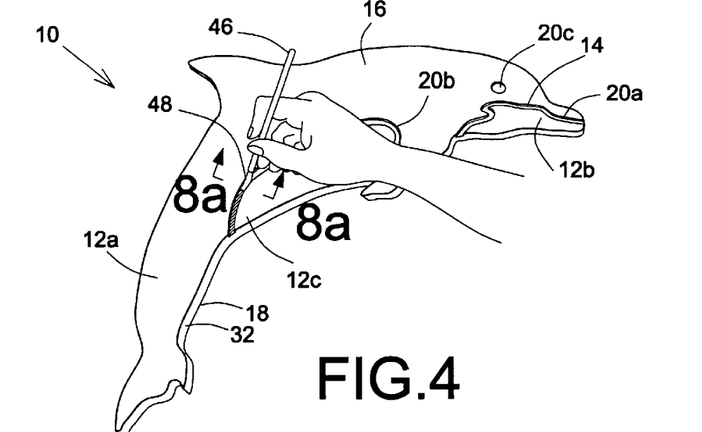
FIG. 4, in a partial perspective view with sections taken out, illustrates a blank such as shown in FIG. 2 having an outlining groove thereof being painted by the hand of an intended user.

Referring to FIG. 4, there is shown a blank 10 in accordance with an embodiment of the present invention. The blank 10 is typically used for forming a decorative structure although it could be used for providing a substrate or canvas for leisure arts and crafts activities such as painting or for any other purposes without departing from the scope of the present invention. In the preferred method of use of the blank 10 hereinafter disclosed in greater details, the blank 10 is initially used for leisure painting thereof and then used as a decorative structure for decorating a supporting surface such as a wall, a tabletop or to like.

Figure 1:
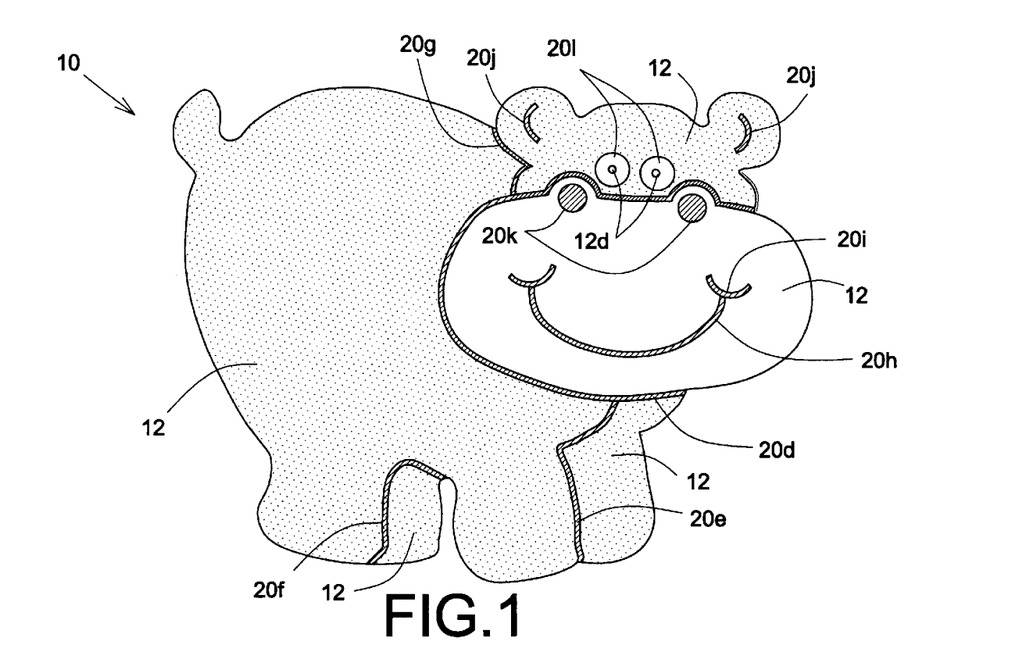
FIG. 1, in a front elevational view, illustrates a blank in accordance with an embodiment of the present invention for forming a decorative structure, said blank displaying a decorative design having feature sections representing a stylized hippopotamus.

The blank 10 typically displays a decorative design that may either abstract or concrete. In the embodiments shown throughout the figures the blank 10 displays decorative designs including stylized animal-related designs. The design of FIG. 1 represents a hippopotamus, the design of FIG. 2 a dolphin and the design of FIG. 3 a body of water having waves formed thereon. It should however be understood that the blank 10 could be used for forming any decorative design including cartoon characters, holiday or special event objects or characters or any other designs without departing from the scope of the present invention.

Each decorative design includes feature sections 12 delimited by an outline 14. Each feature section 12 typically represents a distinctive or characteristic part of the overall design. For example, in FIGS. 2 and 4 through 7, the feature section 12a represent a main body section of the stylized dolphin including the back, the dorsal and frontal fins, a section of the head and the tail of the dolphin. The feature section 12b represents a lower section of the head of the dolphin and the feature section 12c represents the belly of the dolphin.

Figure 10:
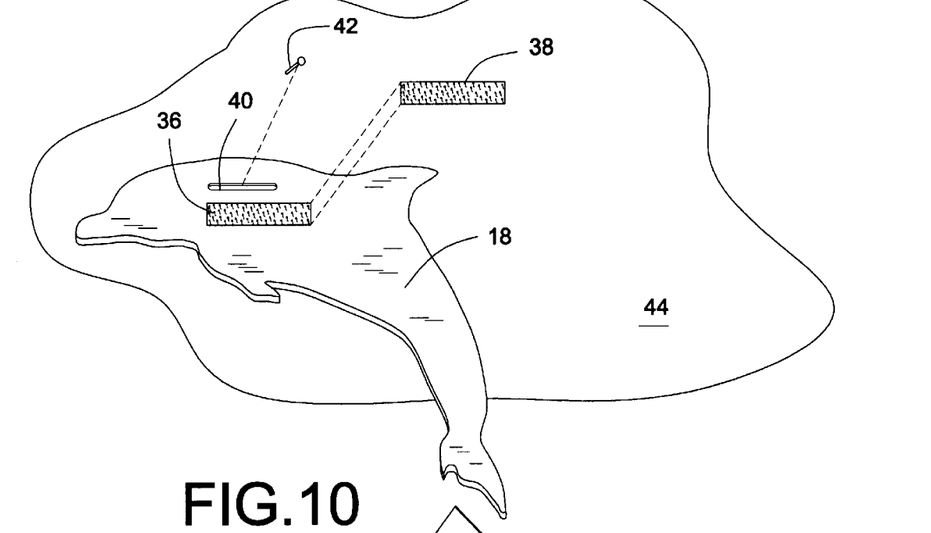
FIG. 10, in a partial rear perspective view, illustrates a blank such as shown in FIG. 4 about to be mounted on a supporting wall.

The blank 10 typically includes a generally rigid panel having a panel first surface 16 and an opposed panel second surface 18 shown in greater details in FIG. 10. The panel has a panel thickness defined as the spacing between the panel first and second surfaces 16, 18.

The blank 10 also includes at least one and typically a plurality of grooves 20 formed in the panel first surface 16. Each groove 20 typically extends at least partially along a section of the outline of at least one feature section 12. Each groove 20 creates a depression or recess in the panel first surface 16 between adjutant feature sections 12.

The grooves 20 may have any suitable shape in order to help in delimiting the feature sections 12. For example, in FIG. 4, the grooves 20a and 20b delimiting the feature section 12a respectively from the feature sections 12b and 12c both have the general configuration of a crooked line. The groove 20c representing an eye of the dolphin has a generally disc-shaped configuration.

In FIG. 1 wherein the design of the blank 10 represents a stylized hippopotamus, grooves 20d, 20e, 20f and 20g respectively used for delimiting the snout, the front legs, the rear legs, and the head of the hippopotamus all have a generally crooked configuration. The grooves 20h, 20i and 20j respectively defining the mouth, the corners of the mouth and the ear channels of the hippopotamus all have a generally arcuate configuration.

The grooves 20k representing the nostrils of the hippopotamus have a generally disk-shaped configuration whereas grooves 20l representing the eyes of the hippopotamus have a generally annular configuration. The grooves 20l are used for delimiting corresponding feature sections 12d representing the pupils of the eyes of the hippopotamus. It should be understood that both the feature sections 12 and the grooves 20 could have any suitable configuration without departing from the scope of the present invention.

Figure 8A:
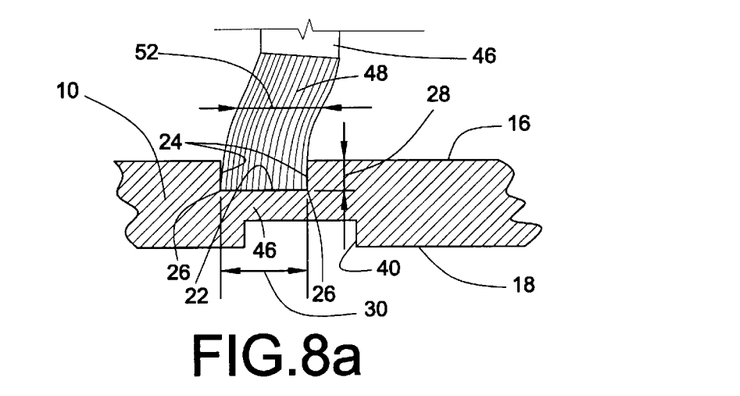
FIG. 8a, in a partial cross-sectional view with sections taken out taken along arrows 8a of FIG. 4, illustrates the cross-sectional configuration of an outlining groove part of the blank, the outlining groove being shown with a painting brush inserted therein.
Figure 8B:
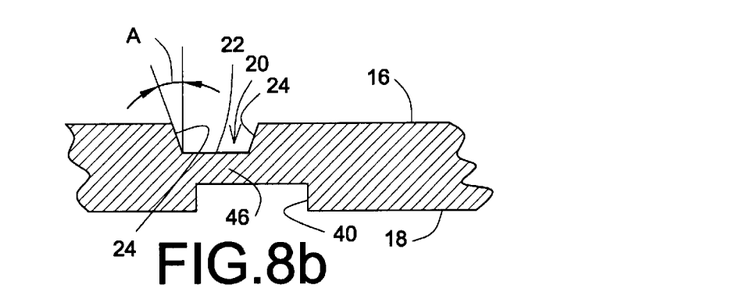
FIG. 8b, in a partial cross-sectional view with sections taken out, illustrates an alternative cross-sectional configuration of the outlining groove shown in FIG. 8a with a painting brush inserted therein.
Figure 9:
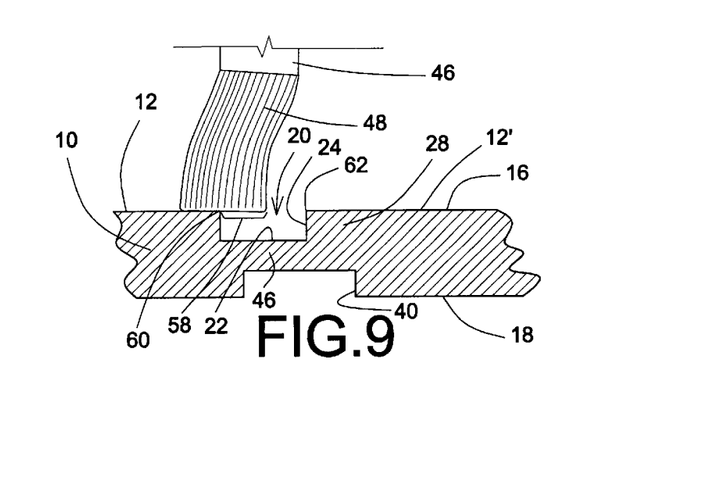
FIG. 9, in a partial cross-sectional view with sections taken out similar to FIG. 8a, illustrates a portion of a feature section part of a blank and located adjacent an outlining groove being painted by a painting brush.

As shown more specifically in FIGS. 8a, 8b and 9, each groove 20 has a groove base wall 22 and a pair of grooves sidewalls 24 extending between peripheral edges 26 of the groove base wall 22 and the panel first surface 16. Each groove 20 defines a groove depth 28 between the groove base wall 22 and the panel first surface 16 and a groove width 30 between adjacent peripheral edges 26 of the groove base wall 22.

The groove depth 28 and the groove width 30 allow for the demarcation of the adjacent feature sections 12. The groove depth 28 and groove width 30 are hence calibrated depending on various parameters such as the overall size of the panel, the desired visual or esthetical effect and the type of coloring implement that will be used for coloring the blank 10 as will be hereinafter disclosed in greater details.

The depth 28 of the grooves 20 is determined taking into consideration the same factors as for the width 30 of the grooves 20 with the added criteria of maintaining structural rigidity. Typically, although by no means exclusively, when a medium density fiberboard panel is used for forming blanks ranging from a few inches to a few feet, the groove width 30 will have a value substantially in the range of one-quarter of an inch. With such criteria, the depth 28 will have a value of between 0.125 and 0.150 inch. Alternatively, the groove width 30 could have a value substantially in the range of 0.125 inch with the depth 28 not exceeding 0.100 inch for reasons which will be hereinafter disclosed in greater detail.

As illustrated in FIGS. 8a and 9, the groove 20 typically has a generally U-shaped cross-sectional configuration with the groove sidewalls 24 extending generally perpendicularly relative to the adjacent peripheral edges 26 of the groove base wall 22. Alternatively, as shown in FIG. 8b, the groove 20 could have a generally U-shaped cross-sectional configuration with the groove sidewalls 24 extending at an angle A relative to the groove base wall 22. The groove sidewalls 24 are shown diverging away from each other in the direction leading from the groove base wall 22 to the panel first surface 16. It should be understood that the groove 20 could have other cross-sectional configurations without departing from the scope of the present invention.

Figure 2:
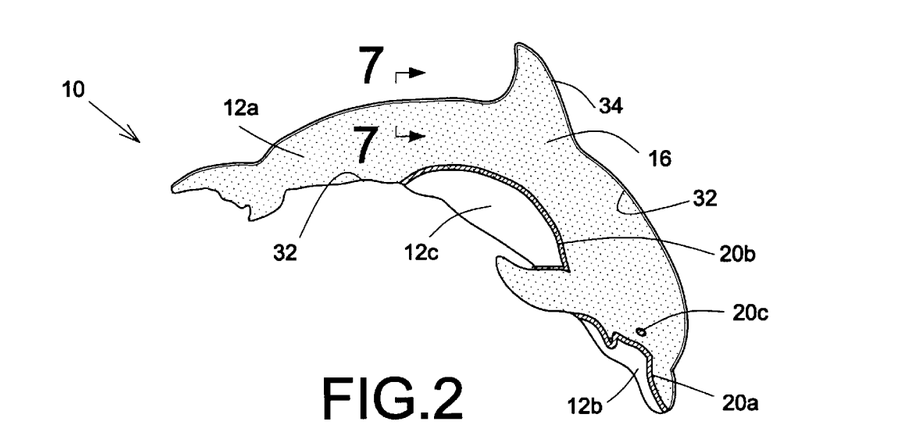
FIG. 2, in a front elevational view, illustrates a blank in accordance with an embodiment of the present invention for forming a decorative structure, said blank displaying a decorative design having feature sections representing a stylized dolphin.
Figure 7:
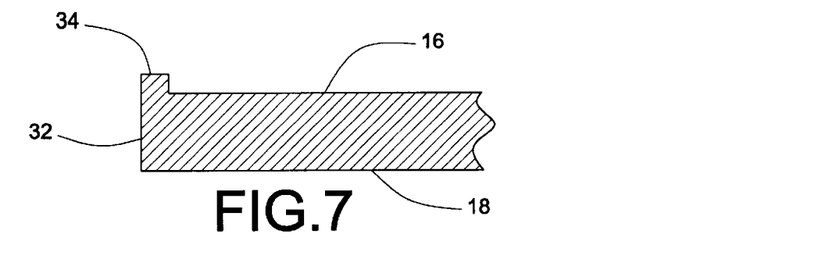
FIG. 7, in a partial cross-sectional view taken along arrows 7—7 of FIG. 2, illustrates a peripheral ridge part of a blank in accordance with an embodiment of the present invention.

As illustrated more specifically in FIGS. 2 and 7, the blank 10 can optionally be provided with a peripheral ridge 34 extending from the panel first surface 16 at least partially along the panel peripheral edge 32 and typically generally adjacent the latter. Although the peripheral ridge 34 shown in FIG. 7 is shown as having a generally square cross-sectional configuration and as being a generally in register with the panel peripheral edge 32 it should be understood that the peripheral ridge 34 could have other cross-sectional configurations and be offset relative to the panel peripheral edge 32 without departing from the scope of the present invention. Also, other ridges 34 extending from the panel first surface 16 could be used at other locations throughout the panel first surface 16 in order to aid in providing a visually pleasing design without departing from the scope of the present invention.

The blank 10 also includes a mounting means attachable to the panel second surface 18 for mounting the panel 10 on a supporting surface 44. Preferably, the mounting means is a releasable type of mounting means for releasably mounting the blank 10 on the supporting surface 44. In at least one embodiment of the invention shown more specifically in FIG. 10, the mounting means includes a first mounting strip 36 attachable to the panel second surface 18 and a cooperating second mounting strip 38 attachable to the supporting surface 44.

Typically, the first mounting strip 36 is provided with miniature hook and loop fiber (often referred to as a Velcro™) while the second mounting strip 38 includes complementary second miniature hook and loop fiber (also conventionally known as Velcro™). Alternatively, the first and second mounting strips 36, 38 could be provided with other attachment components such as layers of suitable adhesive material or the like. In the embodiment shown in FIG. 8, the first strip 36 is provided with adhesive material positioned opposite the miniature hook and loop fiber so as to allow the first strip 36 to be adhesively mounted on the panel second surface 18 by the intended user.

As shown in FIG. 10, the mounting means may also include a mounting recess 40 formed in the panel second surface 18 for receiving a mounting component anchored to the supporting surface 44 such as a nail 42 or the like.

As illustrated in FIGS. 8a, 8b and 9, the panel thickness is typically chosen so that in the event that a groove 20 is positioned generally in register with a section of an anchoring recess 40, an intermediate section 46 extending therebetween will have sufficient thickness to provide structural rigidity. Hence, the thickness of the panel will also be influenced by the groove depth 28, the depth of the anchoring recess 40 and the type of material used for forming in the panel. Also, typically, the thickness of the panel will be chosen so as to allow for the blank 10 to protrude from the supporting surface 44 while being sufficiently lightweight to be easily manipulated and suspended on a vertical supporting surface 44 such as a wall.

As will be hereinafter disclosed in greater detail, at least some of the feature sections 12 and at least some of the grooves 20 are intended to be colored using a coloring implement such as a paintbrush 46 having a coloring section 48 such as bristles for dispensing a collar pigmented material such as paint. It should be understood that the coloring implement could take any suitable form such as a coloring lead pen, a coloring felt pen or the like having a corresponding coloring section or tip and that the color pigmented material could take any suitable form such as coloring lead, coloring ink, paste or the like without departing from the scope of the present invention.

Accordingly, at least some and typically all of the feature sections 12 and at least some and typically all of the groove base walls 22 and at least some of the groove sidewalls 24 are typically made out over a color pigment receiving material allowing the application and retention thereon of the color pigmented material. In situations wherein the color pigmented material is a liquid such as paint, the feature sections 12 and the grooves 20 are preferably made out of a liquid impregnable material so as to allow the color pigmented material to impregnate the feature sections 12 and the grooves 20.

Figure 5:
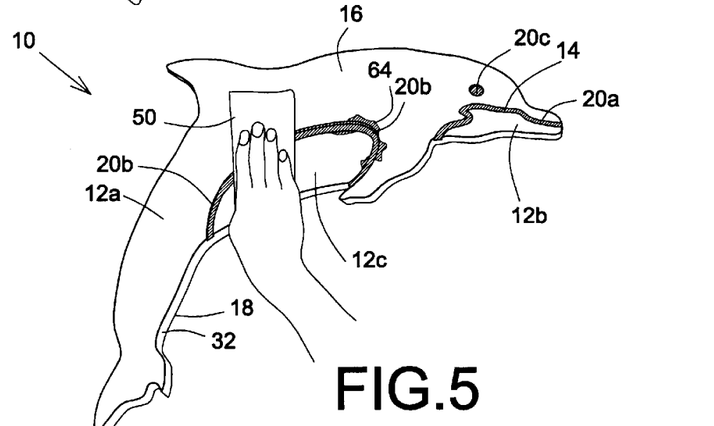
FIG. 5, in a partial perspective view with sections taken out, illustrates a blank such as shown in FIG. 2 having one of its outlining groove painted with a coloring material and wherein the coloring material has formed an overriding portion on an adjacent outlining section, the overriding portion being sanded away by the hand of an intended user.

As will be hereinafter disclosed in greater details, the blank 10 is intended to allow for relatively easy erasing of possible unintentional coloring overlaps. Hence, preferably, the panel and more particularly the panel first surface 16 is also preferably made out of an abrasively removable material allowing for at least a layer of the panel first surface 16 part of a feature section 12 to be abrasively removed by a manual sanding operation using a conventional sandpaper 50 such as shown in FIG. 5.

The groove depth 28 is further determined taking into consideration the fact that sanding of the peripheral edges 60, 62 of a feature section 12 located adjacent the groove 20 may potentially erode part of the groove sidewall 24 leading to a reduction of the groove depth 28. Should the groove depth 28 reach a critical minimal value the risks of having bristles or other coloring sections unintentionally contact the adjacent feature section 12 are increased. Hence, preferably, the groove width-to-groove depth ratio should remain between 1.25 to 2.5 for materials such as fiber boards in situations wherein the groove width 30 has a value between 0.125 to 0.25 inch.

Preferably, the blank 10 is made out of medium density fiberboard providing adequate structural support and liquid impregnability while further providing for the possibility to have a surface portion thereof abrasively removed through a sanding operation, at a relatively low cost. Alternatively, the blank 10 could be made out of other types of abrasively alterable material such as other density fiber boards, chipboards, plywood panels, wood core plywood, panels of cellulose waste or laminates from a plurality of core paper layers containing resin, abrasively removable polymeric resin or any other suitable material without departing from the scope of the present invention.

Figure 11:
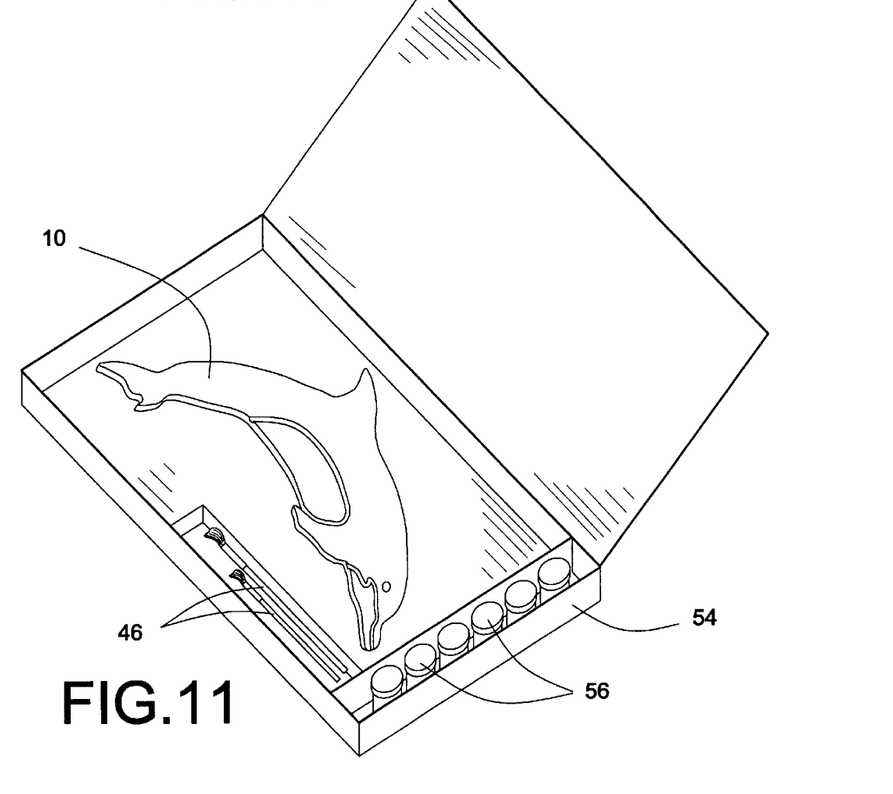
FIG. 11, in a perspective view, illustrates a kit in accordance with an embodiment of the present invention, the kit including a blank such as shown in FIG. 4.

In one embodiment of the invention, the blank 10 is provided in combination with a painting kit including a coloring implement and a color pigmented material. In such situations, the painting implement is typically a paintbrush 46 having bristles 48 defining a bristle width 52 substantially similar to the groove width 30 of the grooves 20 to be painted. In situations wherein the color pigmented material takes the form of a painting liquid, the preferred painting liquid is a non-toxic latex paint so as to provide a relatively safe painting environment for intended users. Also, in situations such as such shown in FIG. 11 wherein the invention is sold as an arts and craft leisure kit, at least one blank 10 is packaged in a receptacle such as a box 54. The box 54 typically also contains a paintbrush 46 and at least a pair of paint containers 56 for packaging painting liquids having at least two distinct colors.

The present invention also relates to a method of using the hereinabove disclosed blank 10 for providing a customizable decorative structure. The method in accordance with the present invention allows an intended user to customize the decorative structure and, hence, to benefit from the enjoyment associated with leisurely exercising artistic talents such as choosing colors and applying the latter to a structure. The method also allows the intended user to use the result of his or her craftsmanship for decorating a supporting surface such as a wall, a tabletop or the like.

The method in accordance with the present invention includes the step of first providing to an intended user a blank such as hereinabove disclosed. The method also includes the step of allowing the intended user to apply a color pigmented material on either or both at least some of the grooves 20 and/or at least some of the feature sections 12.

When color pigmented material is allowed to be applied to a groove base wall 22, the adjacent groove sidewalls 24 are typically allowed to act as guiding means for guiding the application of the color pigmented material on the groove base wall 22 as illustrated in FIGS. 8a and 8b. As mentioned previously, the width 52 of the coloring section 48 of the coloring implement 46 is typically chosen so as to be generally similar to the groove width 30. Hence, the groove sidewalls 24 typically prevent the color pigmented material applied in the groove 20 from overlapping on the adjacent feature sections 12.

When the color pigmented material is applied to a feature section 12 adjacent a peripheral edge thereof, the groove 20 physically separates adjacent peripheral edges of opposed feature sections 12 so as to reduce the risks of unintentionally applying an overlapping layer of coloring material over the adjacent edge of an opposed feature section 12 or into the adjacent groove 20. As illustrated more specifically in FIG.

9, an overlapping portion 58 of a coloring section 48 may overlap across the peripheral edge 60 of a feature section 12 with reduced risks of applying an overlapping layer of color pigmented material on the opposed peripheral edge 62 of an opposed feature section 12' or in the adjacent groove 20. Hence, the grooves 20 allow for the application of the color pigmented material on both the feature sections 12 and the grooves 20 with reduced risks of overlapping so as to allow for the sharp coloring of the blank edges even by an unexperienced or unskilled intended user such as an handicapped person, a child or the like.

The method in accordance with a present invention optionally includes the steps of not only allowing, but also instructing the intended user to apply the color pigmented material on either or both at least some of the feature sections 12 and at least some of the grooves 20. The intended user may be typically instructed to apply the color pigmented material by providing written instructions as to the method of doing so.

Typically, the intended user is instructed to first apply a first color pigmented material having a first color tone in at least some of the grooves 20 and then a second color pigmented material having a distinct second color tone on at least some of the feature sections 12. Typically, a first color pigmented material having a first color tone is applied to at least some and preferably all of the grooves 20 while various other color pigmented materials having other color tones are applied to the various feature sections 12 so as to provide multicolored feature sections 12 delimited by single-colored outlining grooves 20.

Since the method in accordance with the present invention is intended to be used by any suitable type of intended users including unskilled or unexperienced users, the method optionally also includes the step of allowing or instructing the intended user to abrasively removed the surface layer of a soiled feature section 12 should the latter have been unintentionally covered by color pigmented material during the application of the color pigmented material in an adjacent groove 20. Hence, should the color pigmented material be unintentionally applied on an adjacent feature section 12 creating an overlapping painted section 64 such as shown in FIG. 5, the intended user may optionally easily remove the overlapping painted section 64 prior to applying an other color pigmented material having another tone on the corresponding feature section 12.

Figure 6:
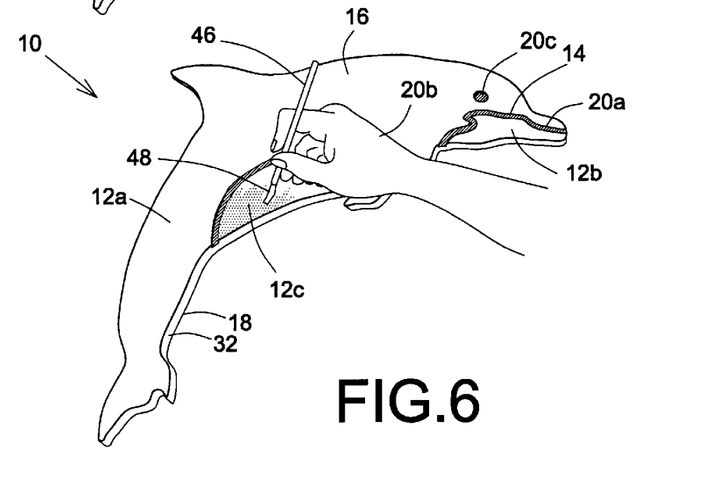
FIG. 6, in a partial perspective view with sections taken out, illustrates a blank such as shown in FIG. 2 having one of its feature sections painted by the hand of an intended user.

Typically, as shown in FIG. 5, since the blank 10 is preferably made out of an abrasively removable material, the painted overlapping section 64 is removed by manually sanding the latter. Once the overlapping painted section 64 is removed, the corresponding feature section 12 may easily be painted such as shown in FIG. 6 using the same coloring implement 48 or another coloring implement 48 having a larger coloring section width 52.

Figure 3:
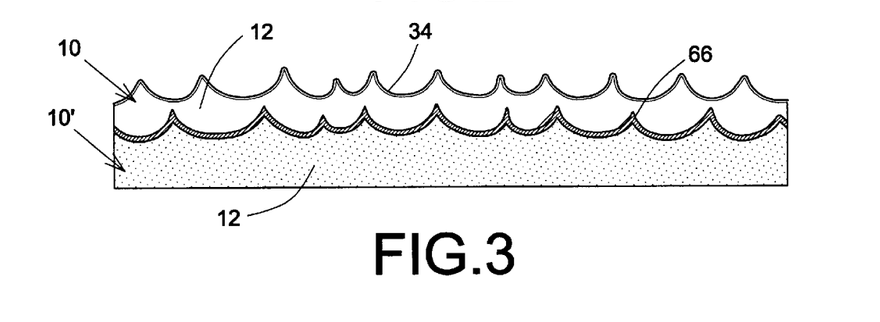
FIG. 3, in a front elevational view, illustrates a blank in accordance with an embodiment of the present invention for forming a decorative structure, said blank displaying a decorative design having feature sections representing waves forming on the top surface of a volume of water.

The proposed method in accordance with a present invention also optionally includes the step of allowing or instructing an intended user to mount a blank 10 on the supporting surface 44 using the mounting means attached to the blank 10. Optionally, the proposed method also involves the step of allowing or instructing the intended user to dispose at least two blanks 10, 10' such as shown in FIG. 3 in a spaced apart relationship relative to each other so that the combined blanks 10, 10' cooperate with each other in forming a composite design in which each of the blanks 10, 10' provides a distinctive design feature. In other words, a plurality of blanks 10, 10' may be mounted on the same supporting surface 44 or on adjacent supporting surfaces such as a ceiling and an adjacent wall in a spaced apart relationship relative to each other so as to define a blank spacing 66 there between or even in a partially overlapping relationship relative to each other (not shown) so as to form a composite design forming a relief on the supporting surfaces. In the example shown in FIG. 3, the blanks 10, 10' are juxtaposed and spaced relative to each other by the blank spacing 66 so as to define a composite design representing waves forming on the surface of a body of water. The waves represented by the blanks 10, 10' of FIG. 3 may be further juxtaposed to the blank 10 of FIG. 2 representing a dolphin so that the combined blanks of FIGS. 2 and 3 provide an overall composite design representing a dolphin jumping into the waves of a body of water. It should be understood that numerous other composite design patterns could be formed using blanks 10 in accordance with the present invention without departing from the scope of the present invention.

It should be understood that the blank 10 could be provided with pre-applied color pigmented materials on the feature sections 12 and/or the grooves 20, with the possibility for the intended user to modify the pre-applied color pigmented materials by applying new color pigmented material thereon as detailed hereinabove without departing from the scope of the present invention.

Although the present method and blank for providing a customizable decorative structure have been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

We claim:

1. A blank for forming a decorative structure, said decorative structure being intended to be used for decorating a supporting surface by displaying a decorative design having feature sections delimited by an outline, at least some of said feature sections and part of said outline being intended to be colored by an intended user using a coloring implement, said coloring implement having a coloring section dispensing a color pigmented material, said blank comprising:

a rigid panel, said panel having a panel first surface and an opposed panel second surface, said panel defining a panel thickness between said panel first and second surfaces;

said panel first surface having a groove formed therein, said groove extending at least partially along a section of said outline for creating a depression in said panel first surface between adjacent feature sections, said groove having a groove base wall and a pair of groove side walls extending between peripheral edges of said groove base wall and said panel first surface, said groove defining a groove depth between said groove base wall and said panel first surface and a groove width said adjacent peripheral edges of said groove base wall, said groove depth and said groove width allowing the demarcation of said adjacent feature sections, said adjacent feature sections and said groove base wall being made out of a pigment receiving material allowing application and retention thereon of said color pigmented material;

whereby said groove physically separates the adjacent peripheral edges of said adjacent feature sections so as to facilitate the application of said color pigmented material on said adjacent feature sections with reduced risks of overlapping so as to allow for the sharp coloring of said adjacent peripheral edges and whereby said groove further guides said coloring section during the application of said color pigmented material to said groove base wall so as to also allow for the sharp delimitation of said adjacent feature sections by said outline.

2. A blank as recited in claim 1 wherein at least a section of said panel first surface is made out of an abrasively removable material whereby a layer of said panel first surface part of a corresponding feature section is abrasively removable by a manual sanding operation using a sand paper.

3. A blank as recited in claim 1 wherein said blank defines a panel peripheral edge, said panel first surface being provided with a peripheral ridge extending from said panel first surface and extending at least partially along said panel peripheral edge adjacent the latter.

4. A blank as recited in claim 1 wherein said groove has a groove width-to-groove depth ratio having a value of between 1.25 to 2.5.

5. A blank as recited in claim 4 wherein said panel is made out of fiberboard, said groove width has a value of 0.25 inch and said groove depth has a value of between 0.125 and 0.100 inch.

6. A blank as recited in claim 4 wherein said panel is made out of fiberboard, said groove width has a value of 0.125 inch and said groove depth has a value no greater than 0.100 inch.

7. A blank as recited in claim 1 wherein said groove has a U-shaped cross-sectional configuration with said groove side walls extending perpendicularly from said peripheral edges of said groove base wall.

8. A blank as recited in claim 1 wherein said groove has a U-shaped cross-sectional configuration with said groove side walls extending at an angle relative to said groove base wall, groove side walls diverging outwardly away from each other in a direction leading from said groove base wall to said panel first surface.

9. A blank as recited in claim 1 wherein said color pigmented material is a liquid and wherein said adjacent feature sections and said groove base wall are made out of a liquid impregnable material for allowing said color pigmented material to impregnate said adjacent feature sections and said groove base wall.

10. A blank as recited in claim 1 further comprising a mounting means attachable to said panel second surface for mounting said panel on said supporting surface.

11. A blank as recited in claim 10 wherein said mounting means is a releasable mounting means for releasably mounting said panel on said supporting surface.

12. A blank as recited in claim 11 wherein said mounting means includes a first mounting strip of miniature hook and loop fiber and a complementary second mounting strip of miniature hook and loop fiber, said first and second mounting strips being attachable respectively to said panel second surface and to said supporting surface.

13. In combination, a blank for forming a decorative structure and a coloring implement for coloring at least part of said decorative structure, said decorative structure being intended to be used for decorating a supporting surface by displaying a decorative design having feature sections delimited by an outline, at least part of said outline being intended to be colored by an intended user using said coloring implement, said coloring implement having a coloring section for dispensing a color pigmented material, said coloring section having a coloring section width, said blank comprising:

a rigid panel, said panel having a panel first surface and an opposed panel second surface, said panel defining a panel thickness between said panel first and second surfaces;

said panel first surface having a groove formed therein, said groove extending at least partially along a section of said outline for creating a depression in said panel first surface between adjacent feature sections, said groove having a groove bottom surface and a pair of groove side walls extending between the peripheral edges of said groove bottom surface and said panel first surface, said groove defining a groove depth between said groove bottom surface and said panel first surface and a groove width between adjacent peripheral edges of said adjacent feature sections separated by said groove, said groove being configured and sized for substantially fittingly receiving at least a section of said coloring section and for allowing said coloring section to contact said groove base wall without contacting said adjacent feature sections, said adjacent feature sections and said groove bottom surface being made out of a pigment receiving material allowing the application and retention thereon of said color pigmented material;

whereby said groove physically separates the adjacent peripheral edges of said adjacent feature sections so as to facilitate the application of said color pigmented material on said adjacent feature sections with reduced risks of overlapping so as to allow for the sharp coloring of said adjacent peripheral edges and whereby said groove further guides said coloring section during the application of said color pigmented material to said groove bottom surface so as to also allow for the sharp delimitation of said adjacent feature sections by said outline.

14. A combination as recited in claim 13 further comprising a first color pigmented material and a second color pigmented material, said first and second color pigmented materials being in a liquid form, said first and second color pigmented materials having distinct color tones, said adjacent feature sections being made out of an abrasively removable material; said adjacent feature sections and said groove base wall being made out of a liquid impregnable material for allowing said color pigmented material to impregnate said adjacent feature sections and said groove base wall;

whereby said first color pigmented material is intended to be applied on said groove base wall and said second color pigmented material is intended to be applied on said adjacent feature sections and wherein adjacent feature sections having been unintentionally covered by said first color pigmented material during the application of said first color pigmented may be abrasively cleared of said first color pigmented material prior to applying said second color tone on said adjacent feature sections by a manual sanding operation.

15. A combination as recited in claim 13 further comprising a mounting means attachable to said panel second surface for mounting said blank on said supporting surface.

16. A combination as recited in claim 15 wherein said mounting means is a releasable mounting means for releasably mounting said blank on said supporting surface.

17. A combination as recited in claim 15 wherein said mounting means includes a first mounting strip of miniature hook and loop fiber and a complementary second mounting strip of miniature hook and loop fiber, said first and second mounting strips being attachable respectively to said panel second surface and to said supporting surface.

18. A combination as recited in claim 13 wherein said blank is a first blank, said combination further including at least a second blank, said first and second blanks being mountable on said supporting surface in a spaced relationship relative to each other so that said first and second blanks together complementarily form a predetermined wall decorating pattern.

* * * * *